United States Patent [19]

Putzer

[11] 4,045,535

[45] Aug. 30, 1977

[54] METHOD OF CASTING COMPOSITIONS IN ELASTOMERIC MOLDS

[75] Inventor: Raymond M. Putzer, Racine, Wis.

[73] Assignee: Resment Inc., Racine, Wis.

[21] Appl. No.: 626,367

[22] Filed: Oct. 28, 1975

[51] Int. Cl.² .................. C08G 14/14; C08G 18/08
[52] U.S. Cl. .................. 264/313; 260/33.6 UB; 260/59 R; 260/77.5 A; 260/77.5 AP; 264/318; 264/331; 264/335; 264/337; 264/DIG. 77; 264/DIG. 78
[58] Field of Search .............. 264/313, 316, 318, 331, 264/337, 335, 334, 102, 225, DIG. 77, DIG. 78; 260/33.60 B, 38, 42, 47, 52, 77.5 A, 77.5 AP, 2.5 AP

[56] References Cited

U.S. PATENT DOCUMENTS

| | | | |
|---|---|---|---|
| 3,242,107 | 3/1966 | Bunge et al. | 260/33.60 B |
| 3,341,646 | 9/1967 | Britain | 264/337 |
| 3,355,526 | 11/1967 | Molnar | 264/331 |
| 3,429,848 | 2/1969 | Robins | 260/52 |
| 3,485,797 | 12/1969 | Robins | 260/52 |
| 3,504,079 | 3/1970 | Hall | 264/225 |
| 3,576,930 | 4/1971 | Watters et al. | 264/316 |
| 3,676,392 | 7/1972 | Robins | 260/38 |
| 3,776,683 | 12/1973 | Putzer et al. | 264/335 |
| 3,856,908 | 12/1974 | Harper | 264/313 |
| 3,948,824 | 4/1976 | Robins | 260/2.5 AP |

Primary Examiner—Jeffery R. Thurlow
Attorney, Agent, or Firm—James E. Nilles

[57] ABSTRACT

A method of casting liquid compositions in elastomeric molds wherein the casting composition has a reaction temperature below about 235° F comprising:

a. introducing an organic solvent soluble polyol, a liquid polyisocyanate and a basic curing catalyst having a $pK_b$ value from between 7 and about 11 into an open elastomeric mold, b. controlling the ratio of polyol to polyisocyanate and the concentration of the curing catalyst and casting the resin such that the cured resin is: substantially free from entrapped air at the mold surface, free from foaming, has a cast time of generally less than about 15 minutes, has a tensile strength of at least about 2500 psi, c. removing the cast resin from the mold shortly after the composition is cast thereby providing unexpected prolonged mold life. The resin undergoes substantially no change in volume from the liquid to the cured state.

18 Claims, 4 Drawing Figures

METHOD OF CASTING COMPOSITIONS IN ELASTOMERIC MOLDS

FIELD OF INVENTION AND PRIOR ART

Extensive research has been devoted to developing room temperature curable binding resins. These resins have been found to be particularly useful when combined with various aggregate materials for use in industrial applications such as foundry cores. The binder resin permits the foundry mix to be molded or shaped into the desired form and thereafter cured to form a self-supporting structure.

Typically, sand is used as the aggregate material. After the sand and binder have been mixed, the resulting foundry sand mix is rammed, blown, or otherwise introduced into a pattern, thereby assuming the shape defined by the adjacent surfaces of the pattern. Then by the use of catalysts or the use of heat, the polymerizable binder is caused to polymerize, thereby converting the formed, uncured foundry sand mix into a hard, solid cured state. Such hardening can be accomplished in the original pattern, in a gasing chamber or in the holding pattern as taught in U.S. Pat. Nos. 3,145,438 and b 3,121,268.

U.S. Pat. Nos. 3,429,848; 3,485,797 and 3,676,392 teach the preparation and characterization of room temperature curable binding resins and resin mixtures which have long bench lives and short cure time. These resins are described as providing superior mechanical properties in the cured product.

SUMMARY OF THE INVENTION

It has now been discovered that certain of the binder resins such as described above can be used as casting resins in flexible elastomeric molds. It is most unexpected that these resins would be useful as casting resins in flexible molds and/or that they would be capable of repeatedly reproducing critical dimensions and details including finish. Moreover, these cast resins can be further decorated and have a finish receptivity which is difficult to achieve with most molding compositions. Further, the cured resins of this invention have further been found to have unobvious and unexpected mold release properties while providing substantial improvements in mold life.

The present invention is directed to a method of casting liquid compositions in elastomeric molds wherein the casting composition has a reaction temperature below about 235° F. comprising:

a. introducing an organic solvent soluble polyol, a liquid polyisocyanate and a basic curing catalyst having a $pK_b$ value from between about 7 and about 11 into an elastomeric mold, b. controlling the ratio of polyol to polyisocyanate and the concentration of the curing catalyst and casting the resin such that the cured resin is: substantially free from entrapped air at the mold surface, free from foaming, has a cast time of generally less than about 15 minutes, has a tensile strength of at least about 2500 psi, c. removing the cast resin from the mold shortly after the composition is cast thereby providing unexpectedly prolonged mold life. The resin undergoes substantially no change in volume from the liquid to the cured state.

When these cured resins are removed from the mold they are observed to have the following properties. They:

a. are substantially bubble free at the mold surface,
b. have mold release values of at least about 10 inches of Mercury,
c. undergo a change in volume of less than about 1%, and
d. have a critical surface tension for wetting of at least about 35 dynes/cm.

Quite unexpectedly it has been observed that at certain ratios of polyol to isocyanate, and at certain catalyst concentrations finished objects can be molded which are not only substantially bubble free at the mold surface but can be removed from the mold readily, shortly after the resin is cast by merely flexing the mold.

The low initial viscosity, low exotherm, excellent mold release and relatively long bench life properties of these resins in combination with their relatively short set time make these resins particularly useful with elastomeric molds such as described in U.S. Pat. No. 2,776,683 to Putzer et al. For example, these resins have been found particularly useful in the commercial casting of items such as art objects, statuary, lamp bases and home decor pieces.

For the purposes of the present invention a flexible elastomeric mold is defined as a substantially non-heat absorbing mold which is non-pressurized and distensible upon the application of a pressure differential to the mold cavity. In a preferred embodiment the elastomeric mold is inert, self supporting and remains substantially free from interaction with the casting resin. In a particularly preferred embodiment of the invention, the elastomeric mold is a one piece silicone mold. These silicone molds are described in detail below and have been observed to generally produce a smooth glossy finish.

For the purposes of the present invention mold release is defined as the force required to remove a cured casting resin from an elastomeric mold. This force is measured by the vacuum applied to the mold cavity in inches of mercury. Generally a vacuum of from between about 10 and about 25 inches of mercury are required to release the cured casting resins of the invention from an elastomeric mold which has not been treated with a mold release agent. In a preferred embodiment of the invention less than 15 inches of mercury is required.

For the purposes of the present invention, finish receptivity is defined as the ability of the cured resin to accept standard finishing products such as oil stains. It is measured by means of the surface tension of the cast object. That is the critical surface tension for wetting of the cast resins of the invention are generally above about 35 dynes/cm. In a preferred embodiment of the invention the critical surface tension for wetting of the cured resins is greater than about 40 dynes/cm. In contrast, comparable resin compositions cured in a elastomeric mold treated with a mold release agent will have critical surface tension values substantially lower i.e. from 15 to 25 dynes/cm.

Those cured resins of the invention having a critical surface tension for wetting of greater than about 35 dynes/cm are characterized by the unique property of accepting stains uniformly. The commercial value of this property is significant in those areas such as statuary and lamp casting where the cast object can be stained upon removal from the mold with no intervening treatment of the surface.

OBJECTS OF THE INVENTION

It is therefore an object of the present invention to provide methods of casting novel low exotherm, casting resin compositions, in elastomeric molds.

It is another object to provide novel methods of casting resin compositions with superior mold release and finish receptivity.

It is further object to provide methods of casting compositions with superior dimensional stability and structural strength.

Still another object of the present invention is to provide methods for casting compositions with elastomeric molds which provide unexpected improvement in mold life.

Yet another object of the invention is to provide methods of casting compositions which upon curing produce a substantially bubble free surface at the mold/cured resin interface.

A further object of the invention is to provide methods of casting low viscosity casting resins to reproduce fine detail objects.

Still another object of the invention is to provide methods of casting objects which are substantially bubble free and free from foaming at the surface and have improved finish receptivity.

Another object of the invention is to provide methods of casting compositions which combines low exotherm, low initial viscosity, low volume change and long bench life with fast curing time and superior mold release properties.

These and other objects will become apparent from the following drawings, description and claims.

THE DRAWINGS

In the drawings: FIG. 1 is a graph illustrating the plot obtained with varying ratios of polyol to polyisocyanate and the corresponding peak exotherm of these blends.

THE CASTING RESINS

Figure 1:
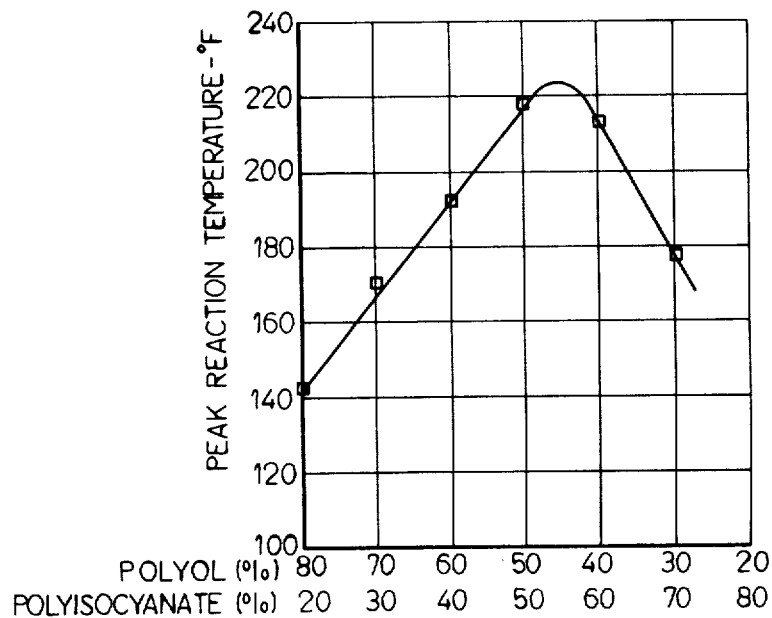

A casting resin for the purposes of the present invention is defined as a pourable admixture which will wet out the mold into which it is poured, react and cure and then upon removal from the mold defines in detail the cavity of the mold.

The liquid casting resins of the invention are characterized by relatively low peak exotherms and undergo substantially no volume change from the liquid to the cured state. These compositions are preferably water free. The resins are mixed and introduced into the mold under conditions which minimize air entrappment. The casting resins of the invention can be treated with a vacuum means to withdraw excess air from the liquid composition prior to casting. These resin compositions have a capacity for absorbing entrapped air from the mold prior to curing.

Broadly described, the casting resins of the present invention comprise organic solvent soluble polyols in non-aqueous systems which have been combined with sufficient polyisocyanate to cross-link the polyol and which contain as the curing catalyst, a basic catalyst having a $pK_b$ value from between about 7 and about 11 as determined in a known manner as described below.

The ratio of polyol to polyisocyanate in combination with catalyst concentration has been found to significantly affect the properties of the cured resin. This is discussed in detail below.

The resin compositions of the present invention are generally made available as a two-package system comprising the polyol component in one package and the polyisocyanate hardener component in the other package. Both these components are in liquid form and therefore generally comprise organic solvent solutions. In general the catalyst is incorporated into the polyol although such is not essential. At the time of use, the contents of the two packages are combined: a low exotherm reaction occurs in a relatively short period of time. This reaction generally remains under about 235° F and in the preferred embodiment is from between about 150° F and about 210° F.

The reacted admixture has a surprisingly low initial viscosity which in combination with a relatively long bench life makes it particularly suitable for casting objects with critical dimensions and fine detail in elastomeric molds. That is, the fluid admixture tends to fill in the critical areas of the flexible mold and remains fluid sufficiently long to allow entrapped air present to be absorbed into the casting resin away from the mold surface prior to curing. This absorption of air is essential to producing castings substantially free from bubbles at the casting surface.

It has been observed that the capacity of the casting resin to absorb entrapped air prior to setting can be improved by drawing a vacuum on the polyol and isocyanate components prior to mixing and/or shortly after they are mixed. Further, it has been observed that the absorption of the entrapped air bubbles prior to setting can be further improved by placing the mold under pressure during the short curing stage. Moreover, the substantially bubble free property of the cast objects of the invention is more difficult to obtain when similar resins are molded in conventional molds such as two piece metal molds.

Perhaps one of the most surprising and unexpected advantages of the casting resin compositions of the invention is their dimensional stability. That is, these casting resins, which appear to undergo a critially balanced phase inversion, when cast in flexible elastomeric molds tend to undergo substantially no change in volume as they change from a liquid to a solid. There is no apparent loss of solvent. It is suggested that this capability to maintain such critical volume dimensions in elastomeric molds is a synergistic reaction between the casting resin and the elastomeric mold. The critical relationship between the phase inversion and the physical properties of the mold is evident from certain of the examples set out below wherein certain casting compositions of the invention undergo substantial dimensional change from the liquid to the solid state in metal molds whereas these same resins undergo less than about 0.1% change in volume when cast in certain elastomeric molds.

During the curing step, the polymerization of the polyol and polyisocyanate produces an insoluble continuous solid phase which occludes the solvent. The cured resins of the invention exhibit excellent structural integrity and undergo substantially little change in area at 120° F. That is, it has been observed that this entrapped solvent is unexpectedly retained even under conditions of stress in contrast to the various water extended polyesters promoted as casting resins in the furniture industry today. For example, these latter resins undergo substantial loss of water after curing as evidenced by their warpage and shrinkage when stored at 120° F.

The peak exotherm during curing is not high enough to cause the solvent to flash off. This minimizes the effect on volume. In addition, the solvent is hydrophobic and accordingly the reaction mixture is maintained substantially free from water thereby minimizing the generation of $CO_2$ or other bubble forming conditions which could effect a volume change.

As will be appreciated from the discussion of FIG. 1 below, the peak exotherm of various resin compositions of the invention is generally below about 235° F. At these temperatures, thermal construction is avoided upon cooling, thereby minimizing change in volume. With certain commercial polyester casting resins and epoxy casting resins peak exotherm temperatures well above 300° F are generally achieved with corresponding changes in volume upon cooling.

THE POLYOL

The polyols suitable for the invention are soluble in organic solvents and are capable of being readily mixed with minimum mechanical agitation with certain polyisocyanates described below to produce relatively low exotherm reactions with substantially no volume change.

The benzylic ether polyols which comprise one species of the preferred phenolic polyols employed in the present invention are characterized by containing a unit having the formula:

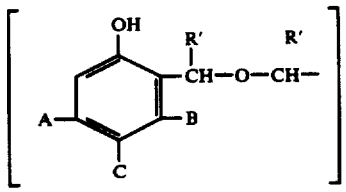

wherein A,B, and C are hydrogen, hydrocarbon radicals, oxyhydrocarbon radicals or halogen, the R's are individually H or hydrocarbon radical of one to eight carbon atoms and which have average degrees of polymerization, as measured by the number of repeating aromatic rings, of generally 3 to 100 and preferably 4 to 10. Although higher molecular weight polyols are operable in the curing reactions above described such polyols are difficult to handle from the standpoint of viscosity in requiring excessive amounts of solvents to bring the viscosity of the polyol to a level normally desired in casting.

The described benzylic ether polyols are condensation polymers of a phenol having the general formula:

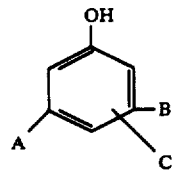

wherein A,B, and C are hydrogen, hydrocarbon radicals, oxyhydrocarbon radicals, or halogen, with an aldehyde having the general formula R'CHO wherein R' is a hydrogen or a hydrocarbon radical of one to eight carbon atoms, prepared in the liquid phase in the substantial absence of water at temperatures below about 130° C in the presence of catalytic concentrations of a metal ion dissolved in the reaction medium. The molar ratio of aldehyde to phenol can generally be varied from 3:1 to 1:1, although some polyol is also formed outside these ratios. The preparation and characterization of these polyols is disclosed in greater detail in U.S. Pat. No. 3,485,797 issued Dec. 23, 1969. In the preferred form, these polyols have the general formula:

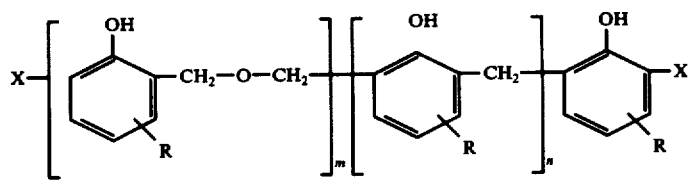

wherein R is a hydrogen or a phenolic substituent metal to the phenolic hydroxyl group, the sum of m and n is at least 2, X is an end group from the group consisting of hydrogen and methyol and wherein m is at least 1 and the sum of m and the number of methylol end groups is at least 2.

The most preferred benzylic ether polyols employed in the polyols of the present invention are those in which R is hydrogen.

The phenols employed in the formation of the benzylic ether polyols are generally all phenols which have heretofore been employed in the formation of phenolic polyols generally, and which are not substituted at either of the carbon atoms ortho to the hydroxyl group. Any one, all, or none of the remaining carbon atoms of the phenol ring can be substituted. The nature of the substituent can vary widely and it is only necessary that the substituent not interfere in the polymerization of the aldehyde with the phenol at the ortho-position. Substituted phenols employed in the formation of the phenolic polyols include alkyl substituted phenols, aryl-substituted phenols, cycloalkyl-substituted phenols, alkenyl-substituted phenols, alkoxy-substituted phenols, aryloxy-substituted phenols, and halogen-substituted phenols, the foregoing substituents containing from one to 26 and preferably from one to six carbon atoms. Specific examples of suitable phenols, aside from the preferred unsubstituted phenol, include: m-cesol, p-cresol, 3,5-xylenol, 3,4-xylenol, 2,3,4-trimethyl phenol, 3-ethyl phenol, 3,5-diethyl phenol, p-butyl phenol, 3,5-dibutyl phenol, p-amyl phenol, p-cyclohexyl phenol, p-octyl phenol, 3,5-dicyclohexyl phenol, p-phenyl phenol, p-crotyl phenol, 3,5-dimethoxy phenol, 3,4,5-trimethoxy phenol, p-ethoxy phenol, p-butoxy phenol, 3-methyl-4-methoxy phenol, and p-phenoxy phenol.

The aldehydes reacted with the phenol can include any of the aldehydes heretofore employed in the formation of phenolic polyols such as formaldehyde, acetaldehyde, propionaldehyde, furfuraldehyde, and benzaldehyde in general, the aldehydes employed have the formula R′CHO wherein R′ is a hydrogen or a hydrocarbon radical of one to eight carbon atoms. The most preferred aldehyde is formaldehyde.

The methylol-terminated phenolic polyols useful in the present invention are resole polyols which are organic solvent soluble. The organic solvent soluble resole polyols are a well established class of polyols the preparation of which is known. However, since the resole polyols having a high proportion of ortho-ortho methylene linkages are generally the organic solvent soluble resole polyols, the majority of the resole polyols useful in this invention are prepared from alkyl-substituted phenols wherein the para position is substituted. On the other hand, organic solvent soluble resole polyols may also be prepared from phenols unsubstituted in the ortho and para positions by first preparing an ortho-ortho novolac and then reacting the novolac with further formaldehyde under milder conditions to product a methylol-terminated polyol which is an organic solvent soluble resole polyol unsubstituted at the para positions. As an illustration of this procedure, a mixture of phenol and formaldehyde wherein the molar ratio of phenol to formaldehyde is greater than 1:1 may be condensed in the presence of an ortho-ortho directing catalyst, such as sodium hydroxide, under alkaline pH, e.g. between 5 and 6, and at a temperature in the neighborhood of 160° C. When essentially no free formaldehyde remains, the excess phenol is removed by vacuum distillation and the polyol cooled to the neighborhood of 40° C or 50° C. Additional formaldehyde is then added and the subsequent exothermic reaction controlled to keep the temperature below about 95° C. This mixture is then rapidly cooled before the polyol becomes insoluble, which results in a methol-terminated organic solvent soluble resole polyol having essentially no para substitution and being useful in this invention. The disclosures of British Pat. Nos. 773,510 and 773,547 are particularly pertinent to the above resole polyol prepared from phenol unsubstituted in the meta and para positions.

The phenolic polyol component is generally employed as a solution in an organic solvent although it is also feasible to employ the low molecular weight liquid polyols without dilution. The desirability and effect of solvents will subsequently be described in greater detail. The optimum solvent concentrations for the phenolic polyols will vary depending on the type of polyols employed and its molecular weight. In general, the solvent concentration will be in the range of up to 80% by weight of the polyol solution and preferably in the range of 20 to 80 percent. It is preferred to keep the viscosity of the polyol component at less than X-1 on the Gardner-Holt Scale.

Other polyols useful in the resin compositions of the invention include the various polyethers, polyol adducts, polyol condensation products and polyester polyols described in U.S. Pat. No. 3,644,165.

THE POLYISOCYANATE

The polyisocyanates suitable for the invention are soluble in organic solvent, readily mixed with minimum mechanical agitation with certain polyols described above to produce relatively low exotherm reactions with substantially no volume change.

The polyisocyanate composition comprises an aliphatic, cycloaliphatic, or aromatic polyisocyanate having preferably from two to five isocyanate groups. If desired, mixtures of polyisocyanates can be employed. Less preferably, isocyanate prepolymers formed by reacting excess polyisocyanate with a polyhydric alcohol, e.g. a prepolymer of toluene diisocyanate and ethylene glycol, can be employed. Suitable polyisocyanates include the aliphatic polyisocyanates such as hexamethylene diisocyanate, alicyclic polyisocyanates such as 4,4′-dicyclohexylmethane diisocyanate, and aromatic polyisocyanates such as 3,4-and 2,6-toluene diisocyanate, diphenylmethyl diisocyanate, and the dimethyl derivatives thereof. Further examples of suitable polyisocyanates are 1,5-naphthalene diisocyanate, triphenylmethane triisocyanate, xylylene diisocyanate, and the methyl derivatives thereof, polymethylenepolyphenol isocyanates, chlorophenylene-2,4-diisocyanate, and the like. Although all polyisocyanates react with the described polyol to form a cross-linked polymer structure, the preferred polyisocyanates are aromatic polyisocyanates and particularly diphenylmethane diisocyanate, triphenylmethane triisocyanate, complex commercially available compositions containing polymeric isocyanates sold under such trademarks as "PAPI", "Mondur MR" and "NCO-120", and mixtures thereof.

The polyisocyanate is employed in sufficient concentrations to cause the curing of the polyol and other active hydrogen-containing materials when present. This refers to materials with hydrogen atoms which display activity according to the well-known Zerewitinoff method as described by Kohlen in JACS, 49,3181 (1927). Thus, for example, phenolformaldehyde polyol of the Novolac and/or resole types having an average of two or more active hydrogen atoms per molecule may be employed. For information on Novolacs and resoles the disclosures of U.S. Pat. Nos. 3,242,107 and 3,409,571 and British Pat. No. 757,392 are hereby incorporated by reference to the extent pertinent. When present the total weight of such other active hydrogen-containing material should not exceed three times the weight of the polyol and should preferably be less than that of the polyol. In general, the polyisocyanate will be employed in a range of 10 to 500 weight percent of polyisocyanate based on the weight of the polyol component. Preferably, from 20 to 300 weight percent of polyisocyanate on the same basis is employed. The polyisocyanate is employed in liquid form. Liquid polyisocyanates can be employed in undiluted form. Solid or viscous polyisocyanates are employed in the form of organic solvent solution, the solvent being present in a range of up to 80 percent by weight of the solution.

THE SOLVENT

The solvents suitable for the casting resins of the invention are those solvents for the polyol and polyisocyanate which provide the resulting admixture with a suitable initial viscosity so that it can be poured into a mold. It is essential that the flash point of the solvent be above the peak exotherm of the reaction. In order to aovid side reactions such as the generation of $CO_2$ and foam it is necessary that the solvent be hydrophobic and substantially free from water and that the resin mixture remain free from water while the reaction is taking place.

It is thought that the solvent plays a key role in the unique mold release properties of the compositions of the invention. It is thought the solvent tends to form a film at the casting/mold interface which contributes to the unexpected mold release performance obtained with these compositions and certain elastomeric molds.

These solvents have been observed to provide a novel property to the casting resins in the area of colorability. For example, when the phase inversion characteristic of curing takes place these resins generally take on a buff color as opposed to a dark brown characteristic of resins without solvents. The buff color is attributed to the colloidal suspension of the solvent in the polymerized resin. These solvents have shown receptivity to the addition of soluble dyes and dispersible pigments. The unique finish receptivity of the cast objects of the invention is thought to be a function of the occluded solvent.

Although the solvent employed in combination with either the polyol or the polyisocyanate or for both components does not enter, to any significant degree into the reaction between the isocyanate and the polyol, it can affect the reaction. Thus, the difference in the polarity between the polyisocyanate and a benzylic ether polyols restricts the choice of solvents in which both components are compatible. Such compatibility is necessary to achieve complete reaction and curing of the resin compositions of the present invention. Polar solvents of either the protic or aprotic type are good solvents for the polyol, but have limited compatibility with the polyisocyanates. Aromatic solvents, although compatible with the polyisocyanates, are less compatible with the polyols. It is therefore preferred to employ combinations of solvents and particularly combinations or aromatic and polar solvents. Suitable aromatic solvents are benzene, toluene, xylene, ethyl-benzene, naphthalene, and mixtures thereof. Preferred aromatic solvents are mixed solvents that have an aromatic content of at least 90% and a boiling point range of 280° to 450° F. The solar solvents should not be extremely polar such as to become incompatible with the aromatic solvent. Suitable slightly polar solvents which are compatible with aromatic solvents include, in particular, ester and ether solvents. Suitable more polar but less costly solvents are generally those which have been classified in the art as coupling solvents and include furfural, furfuryl alcohol, cellosolve acetate, butyl cellosolve, butyl carbitol, diacetone alcohol, and "Texanol".

THE CATALYST

The catalyst suitable for the casting resins of the present invention drive the reaction between the polyol and the polyisocyanate at such a rate that adverse secondary reactions are avoided. Generally, these secondary reactions effect dimensional stability and are observed as foaming and swelling of the admixture. These catalysts influence the mechanical properties of the casting resins as shown in Table I below. These catalysts aid in controlling work time as well as cure time and are critical in obtaining a proper balance such that entrapped air can be expelled prior to setting.

The catalyst is generally described as a base having a $pK_b$ value in the range from between about 7 and about 11. The $pK_b$ value is the negative logarithm of the dissociation constant of the base and is a well-known measure of the basicity of a basic material. The higher this number is, the weaker the base. The base falling within this range are generally organic compounds containing one or more nitrogen atoms. Preferred materials are heterocyclic compounds containing at least one nitrogen atom in the ring structure. Specific examples of bases which have $pK_b$ values within the necessary range include 4-alkyl pyridines wherein the alkyl group has from one to four carbon atoms, isoquinoline, arylpyridines such as phenyl pyridine, pyridine, acridien, 2-methoxypyridine, pyridazine, 3-chloro pyridine, quinoline, N-methyl imidazole, 4,4-dipyridine, phenyl-propyl pyridine, 1methylbenzimidazole, and 1,4-thiazine.

In view of the varying catalytic activity and varying catalytic effect desired, catalyst concentrations will vary widely. In general the lower the $pK_b$ value is, the shorter will be the bench life of the composition and the faster, more complete will be the cure. Solvents and any acidity present in added ingredients may affect the catalytic activity. In general, however, catalyst concentrations will range from 0.01 to 10 percent by weight of the polyol.

The effect of various types of mixing techniques and catalyst concentrations on work time, mechanical properties and bubble formation at the surface of the cast object are set out below. These tests were run on a 50:50 blend by weight of a benzylic ether polyol and an aromatic polyisocyanate with a phenylpropyl pyridine catalyst. These admixtures were cast in a RTV silicone mold designed for standard tensile strength measurement having the following general dimensions: 10 × 1¼ × 1 inch.

TABLE I

| Example | Polyol In parts | Polyisocyanate In parts | Catalyst In drops | Type of Mixing | Working Time | Tensile psi | Flexural psi | Shrinkage[1] |
|---|---|---|---|---|---|---|---|---|
| 1 | 200 | 200 | 120 | Hand | 65 sec. | 4230 | 8690 | Less than 0.1% |
| 2 | 200 | 200 | 60 | Hand | 90 sec. | 3930 | 5420 | " |
| 3 | 200 | 200 | 30 | Hand | 120 sec. | 4410 | 8780 | " |
| 4 | 200 | 200 | 12 | Hand | 4 min. 20 sec. | 3810 | 8640 | " |
| 5 | 200 | 200 | 2 | Hand | Aborted after 2 hrs. incomplete cure | — | — | — |
| 6 | 200 | 200 | 120 | Mechanical Malt mixer | 15 sec. 50 sec. | | | |
| 7 | 200 | 200 | 60 | Malt mixer | 90 sec. | | | |
| 8 | 200 | 200 | 30 | Malt mixer | 120 sec. | | | |
| 9 | 200 | 200 | 12 | Malt mixer | 3 min. 45 sec. | | | |
| 10 | 200 | 200 | 6 | Malt mixer | 11 min. | | | |
| 11 | 200 | 200 | 2 | Malt mixer | 18 hrs.[2] | | | |

[1]Shrink test conditions 120° F, 18 days, ¼" × ¼" × 5" specimen.
[2]Foaming occurred.

From the foregoing it is evident that a catalyst is required. Moreover, there is a critical catalyst concentration required to maintain optimum mechanical strength in a casting substantially free from entrapped air. The introduction of air by mechanical means may cause undue dimensional change as will undesirable prolonged reactions due to insufficient catalyst concentration.

DISCUSSION OF THE DRAWINGS

Figure 2:
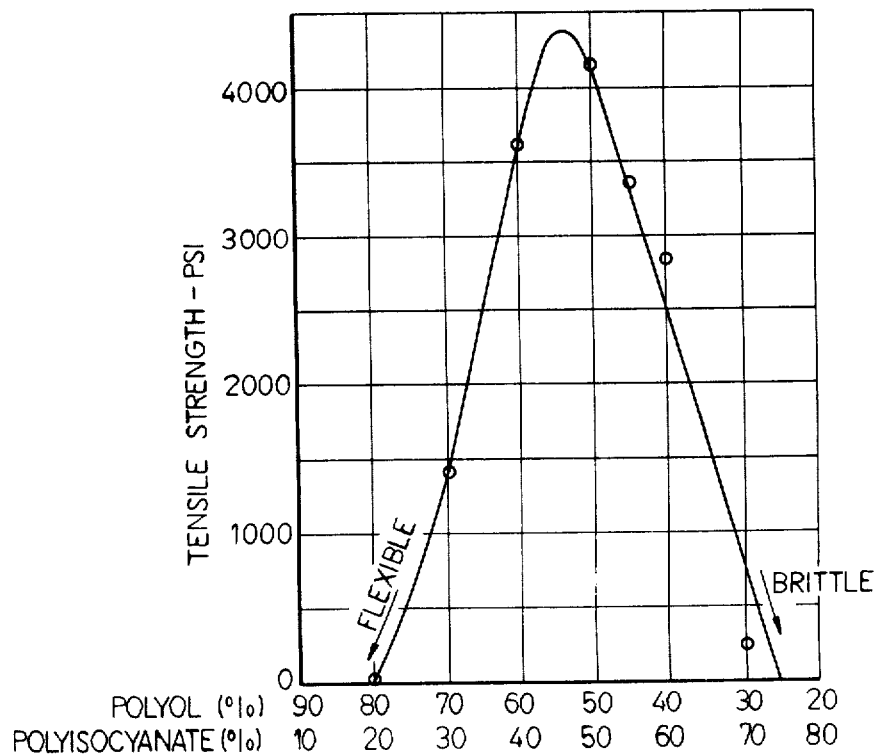
FIGS. 2 and 3 are graphs illustrating the plot obtained with varying ratios of polyol to polyisocyanate and the corresponding tensile strength and elongation properties of these blends.
Figure 3:
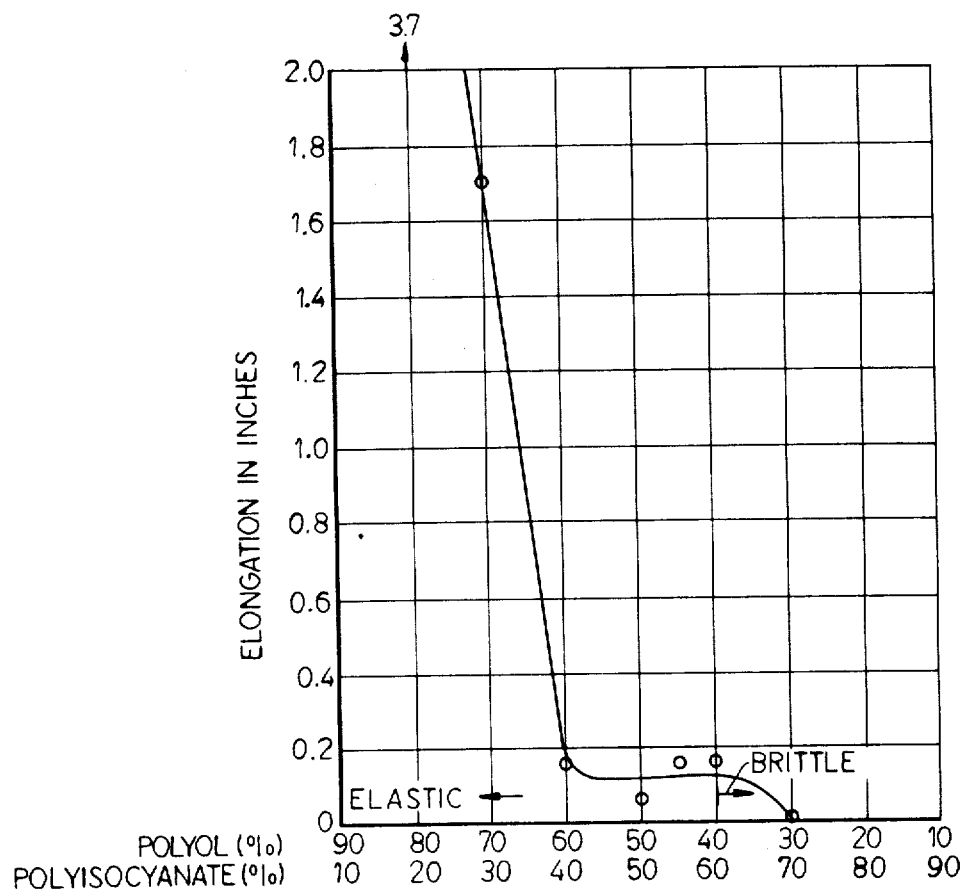

FIGS. 1, 2, and 3 plot the reaction temperature and corresponding tensile strength and elongation properties of various polyol/polyisocyanate blends. It is apparent from these graphs that there is a preferred composition range defining the peak reaction-temperature and the optimum mechanical strength properties of these compositions. That is, as shown in FIG. 3, the blends of polyol to polyisocyanate from above 60% polyol tend to produce elastic castings. Whereas those blends of polyol to polyisocyanate below about 40% polyol tend to produce brittle castings. Thus, for the preferred polyol/polyisocyanate reaction products there appears to be a stoichmetric balance of reaction groups required in order to obtain optimum properties in the cast object and for optimum mold performance.

Figure 4:
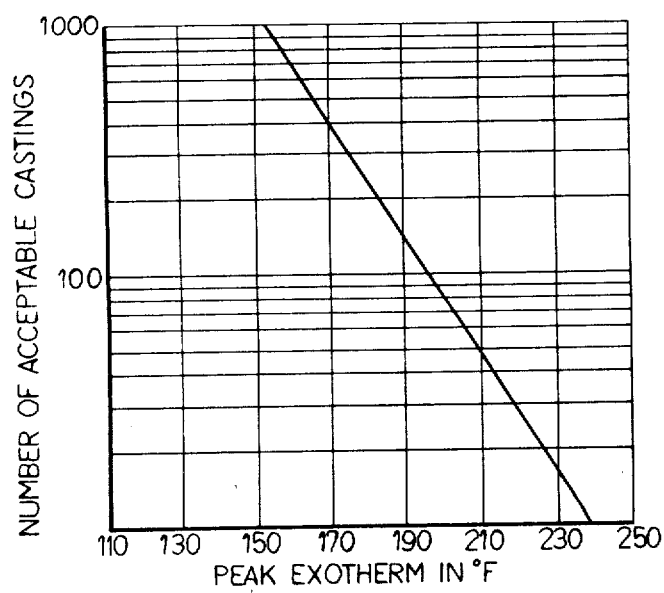
FIG. 4 is a graph illustrating the plot obtained with varying peak reaction temperatures and the corresponding mold life.

FIG. 4 plots the peak exotherm of various casting compositions of the invention and the effect of these compositions on mold life. It has been found that the specific base catalyst employed and the concentration thereof can effect the peak exotherm and influence mold life. Moreover, by selecting those polyols and polyisocyanates that combine with certain catalysts to produce peak reaction temperature of about 150° F a mold life of about 1000 castings if feasible. It has been found that by adding more solvents to such an admixture the peak reaction temperature is lowered further with corresponding improvements in mold life.

The casting compositions of the invention allow for rapid demolding by the application of a pressure differential to the elastomeric mold cavity without distortion of the cured object. This short strip time is another advantage of the invention which has unexpectedly been found to influence mold life. For example, if the cast object can usually be removed within about 60 seconds after it sets without distortion the mold life will be increased significantly.

THE ELASTOMERIC MOLD

The elastomeric materials suitable for fabricating molds for use with casting compositions of the present invention are those elastomers which remain substantially inert towards the casting resins, tolerate peak reaction temperatures as high as about 235° F, can be readily distended to release the cast object and do not require the addition of mold release agents in order to release the casting.

Set out in Table II below are comparisons of various properties of a 50:50 blend of polyol and polyisocyanate similar to that described in Table I above cast in various elastomeric molds and in a standard cast iron mold.

TABLE II

| PROPERTY | TYPE OF MOLD | | | | |
|---|---|---|---|---|---|
| | SILICONE | PVC | RUBBER | URETHANE | METAL |
| Flexibility for demolding | Excellent | Excellent | Excellent | Very restrictive | None |
| Mold release | Good, using 15 inches of vacuum | Same | Same | Not possible | None |
| Temperature Tolerance | Very Good | Poor (plasticizer migrates) | Good | Good | Excellent |
| Chemical reactivity towards casting resin | Non-reactive | Non-reactive | Non-reactive | Reactive | Non-reactive |
| Mold release agent | Not required (could improve mold life) | Protective film required | Fugitive mold release suggested. | Imperative | Required |
| Reproducibility of detail | Excellent | Fair to good | Fair to good | Fair to good | Good |
| Mold life without mold treatment | Excellent | Fair | Fair | Failure | Poor |
| Effect on work time | None | Lengthens | — | — | Extends |

From the foregoing it is evident that the silicone elastomers are ideally suited for the casting resins of the invention. Urethane molds which are not treated with mold release materials are generally not suitable for the casting resins of the present invention. Moreover, treatment of the mold surface with a mold release agent prior to casting adversely effects the finish receptivity of the cured resin.

The present invention is further illustrated by the following examples in which unless otherwise indicated, all parts are by weight and all percentages are weight percentages. All catalysts are measured in drops wherein for example, 10 drops in 100 parts of resin is equivalent to 0.33% by weight. All samples were hand mixed unless otherwise indicated.

EXAMPLE 12

A preferred resin composition of the invention can be prepared as follows.

Into a sealed kettle was charged 62.5 lbs. of phenol, 46.5 lbs. of paraformaldehyde, 0.95 lb. of a 24 percent solution of lead naphthenate in toluene and 4 lbs. of toluene. The vessel was sealed and heated to temperatures of 100° to 125° C for a period of 3 hours. During this heating period, the pressure was maintained at 2 to 4 psi, and steam release from the vessel as pressure increased. Some toluene distilled out with the steam. A total of 24 lbs. of water was removed. After 3 hours, a vacuum was pulled on the reaction mixture to remove all the toluene originally added. The polyol was of the benzylic ether type.

The following polyol and polyisocyanate solutions were made: A polyol solution containing 60% of the polyol described above and 20% cellosolve acetate, 20% Bronco Hi Sol 96 aromatic solvent having a boiling range of 315° to 360° F with a mixed aniline point of 57° F. and 10 drops of phenyl-propyl pyridine, and a polyisocyanate containing 75% Mondor MR and 25% of Bronco Hi Sol 96 aromatic solvent.

The resulting admixture was poured into a paper cup and the peak exotherm was measured. A portion of the admixture was also poured into a flexible elastomeric silicone mold to obtain a standard ASTM tensile test bar. Tensile and elongation measurements were made approximately six days after casting.

Various blends of the polyol and polyisocyanate were prepared and their corresponding properties recorded. These are set out in Table III below. This data is also presented graphically in FIGS. 1-3.

In a preferred embodiment of the invention, the polyol and polyisocyanate are introduced into the elastomeric mold and mixed. Thus the exothermic reaction occurs in situ in the mold.

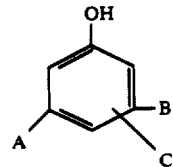

wherein A, B, and C are hydrogen, hydrocarbon radicals, oxyhydrocarbon radicals or halogen, condensed

TABLE III

| Example | Polyol parts | Polyisocyanate parts | Catalyst drops | Peak exotherm ° F. | Tensile strength psi | Elongation of entire sample in inches |
|---|---|---|---|---|---|---|
| 13 | 80 | 20 | 10 | 142 | 30 | 3.7 |
| 14 | 70 | 30 | 10 | 170 | 1420 | 1.7 |
| 15 | 60 | 40 | 10 | 192 | 3622 | 0.15 |
| 16 | 50 | 10 | 10 | 218 | 4158 | 0.06 |
| 17 | 45 | 55 | 10 | — | 3350 | 0.16 |
| 18 | 40 | 60 | 10 | 213 | 2840 | 0.17 |
| 19 | 30 | 70 | 10 | 178 | 250 | 0.005 |

EXAMPLE 20

When various blends of polyols and polyisocyanates such as described in example 12 are cast in a silicone flexible mold it is evident that the mold life is a function of the peak exotherm of the mixture. This is illustrated in FIG. 4.

The following examples are illustrative of other casting resins of the invention some of which are suitable for the purposes of the invention. Also disclosed are examples of compositions which are not suitable for the purpose of the invention.

with an aldehyde having the general formula R'CHO wherein R' is hydrogen or a hydrocarbon radical of one to eight carbon atoms in the presence of catalytic concentrations of a metal ion, or b. a methylol-terminated phenolic polyol which comprises a resole polyol which is organic solvent soluble;

II. said hardener component is a liquid polyisocyanate containing at least two isocyanate groups;

III. said curing agent is a base having a $pK_b$ value in the range from between about 7 and about 11 and is present in an amount equal to 0.01 to 10.0 weight

TABLE IV

| EXAMPLE | POLYOL (parts) | POLYISOCYANATES (parts) | CATALYST (type and concentration in drops) | MIXING | OBSERVATION |
|---|---|---|---|---|---|
| 21 | 75gm PepSet 1505 | 75gm PepSet 2590 | 25 dps PepSet 3595 | Hand | No foaming, buff folor specimen |
| 22 | " | 50gm PAPI | " | " | No foaming, dark brown color |
| 23 | " | 50gm PAPI 135 | " | " | No foaming dark brown color |
| 24 | " | 50gm PAPI 901 | " | " | No foaming, dark browm color |
| 25 | " | 50gm Isonate 143L | " | " | No foaming, stress cracking occurred |
| 26 | " | 50gm Thanate P270 | " | " | No foaming, dark brown color |
| 27 | " | 75gm PepSet 1505 | " | Mechanical (malt mixer) | No foaming, cured before all air bubbles were released |
| 28 | " | 75gm PAPI | " | " | Foaming occurred |
| 29 | 60gm Isonol 550 | 60gm PAPI | 5 dps PepSet 3595 | " | Foaming occurred |
| 30 | " | " | 3 dps Curithane xv26 | " | Foaming occurred |

It is claimed:

1. A method of molding a substantially bubble free object with a mold release value of at least about 10 inches of mercury and with a critical surface tension for wetting of at least about 35 dynes/cm. that undergoes a change in volume of less than about 1%, comprising: introducing into an elastomeric mold an admixture substantially free from water and entrapped air, of a phenolic polyol, a polyisocyanate and a curing catalyst wherein:

I. said polyol is:
  a. an organic solvent soluble benzylic ether polyol which contains benzylic ether group and which comprises a condensation polymer of a phenol having the general formula:

percent based on the weight of the polyol, and

IV. the components are mixed in the mold, the peak reaction temperature is maintained below about 235° F. the composition is maintained free from foaming and phase inversion is obtained by:
  a. controlling the ratio of polyol to polyisocyanate from between about 1:2 and 2:1,
  b. selecting solvents with flash points above the peak reaction temperature, and
  c. maintaining a catalyst concentration sufficient to avoid adverse secondary reactions; the cured casting is removed from the mold by applying a vacuum from between about 10 and about 25 inches of Mercury to the mold cavity.

2. The method of claim 1, wherein the admixture upon curing is substantially free from entrapped air at the mold/resin interface.

3. The method of claim 1, wherein the polyol is a benzylic ether which contains a unit of the formula:

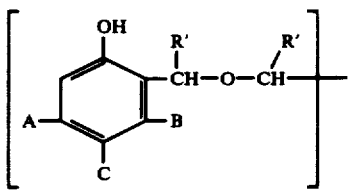

wherein A, B, and C are hydrogen, hydrocarbon radicals, oxyhydrocarbon radicals, or halogen, and wherein R' is a hydrogen or a hyrocarbon radical of one to eight carbon atoms.

4. The method of claim 3, wherein the aldehyde is formaldehyde.

5. The method of claim 3, wherein the aldehyde is formaldehyde, and A and B are hydrogen, and C is a hydrocarbon radical.

6. The method of claim 3 wherein the aldehyde is formaldehyde and A, B, and C are hydrogen.

7. The method of claim 1 wherein the polyol component is a benzylic ether which is obtained by polymerizing the phenol and the aldehyde in the liquid phase in the substantial absence of water at temperatures below about 250° F.

8. The method of claim 1, wherein the polyol is a benzylic ether which has the general formula:

wherein R is hydrogen or a phenolic substituent meta to the hydroxyl group of the phenol, m and n are numbers the sum of which is at least 2, x is an end-group from the group consisting of hydrogen and methylol, and wherein m is at least 1 and the sum of m and the number of methylol end-groups is at least 2.

9. The method of claim 8, wherein R is hydrogen.

10. The method of claim 1, wherein the polyisocyanate is an aromatic polyisocyanate.

11. The method of claim 10, wherein the aromatic polyisocyanate is diphenylmethane diisocyanate.

12. The method of claim 8, wherein the polyisocyanate is an aromatic polyisocyanate.

13. The method of claim 1, wherein the base is a nitrogen compound.

14. The method of claim 1, wherein the base is a heterocyclic nitrogen compound.

15. The method of claim 1, wherein the base is pyridine or a derivative of pyridine.

16. The method of claim 1, wherein the base is a 4-alkyl pyridine wherein the alkyl group has from one to four carbon atoms, isoquinoline, an aryl-pyridine, acridine, 2-methoxy pyridine, 4,4-dipyridine or phenylpropyl pyridine.

17. The method of claim 1, wherein the reaction temperature is maintained below about 210° F.

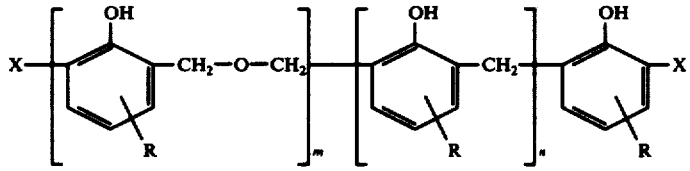

18. The method of claim 1, wherein upon curing the cast resin has:
a. a tensile strength of at least about 2500 psi,
b. a compression strength of at least about 3000 psi, and
c. a flexural stength of at least about 5000 psi.